United States Patent

[11] 3,591,876

| [72] | Inventor | Henry G. Swindlehurst |
| | | St. Clair Shores, Mich. |
| [21] | Appl. No. | 885,451 |
| [22] | Filed | Dec. 16, 1969 |
| [45] | Patented | July 13, 1971 |
| [73] | Assignee | General Motors Corporation |
| | | Detroit, Mich. |

[54] SEAT BUTTON ASSEMBLY
6 Claims, 4 Drawing Figs.

[52] U.S. Cl................................................ 5/356,
24/204, 24/102 T, 52/410, 5/345
[51] Int. Cl........................................................ A47c 31/02
[50] Field of Search............................................ 52/361,
362, 363, 408, 410, 418, 428; 5/354, 345, 356,
353.7; 24/90.1, 102 T, 204

[56] References Cited
UNITED STATES PATENTS
2,223,594  12/1940  Bednarek..................... 5/356
2,983,080  5/1961  Whiteside..................... 52/361
3,315,283  4/1967  Larsen......................... 5/351

Primary Examiner—Bobby R. Gay
Assistant Examiner—Garry Moore
Attorneys—W. E. Finken and Herbert Furman ABSTRACT: A panel of a vehicle seat is supported on the seat springs and a wire or nylon net coated with plastisol or impregnated in a layer of plastisol is secured to the seat springs underneath the panel. A seat button includes a base and a stem, with the stem having an outwardly tapering head at the free end thereof joined to the stem by an annular shoulder. The largest diameter of the head is greater than the normal diameter of an opening or mesh of the net. The stem of the button is inserted through the panel from any point on the outer surface of the panel in alignment with the extent of the net to force the tapered head through a random selected opening of the net or such opening and plastisol layer. The plastisol returns the opening to normal size and locates the net strands defining the opening or such strands and plastisol layer underlying the shoulder to secure the button to the panel.

PATENTED JUL 13 1971

3,591,876

INVENTOR.
Henry G. Swindlehurst
BY
Herbert Furman
ATTORNEY

SEAT BUTTON ASSEMBLY

This invention relates generally to seat button assemblies and more particularly to the mounting of seat button assemblies on panels of vehicle seats.

Conventionally, vehicle seat backs are provided with buttons for aesthetic purposes. Normally such buttons include a base and a stem. The stems are inserted through the panels from the outer surface or layer thereof to the inner surface or layer thereof before the panels are mounted on the supporting seat frame. Various types of individual retainers or locks engage the stem and the inner surface of the panel to lock the stem against withdrawal.

The bases of the buttons are often provided with fabric or plastic covered caps. If such a cap becomes loose or lost, it must be replaced. Since the inner surface of the panel is wholly inaccessible when the panel is assembled to the frame to form the seat back, no access can be gained to the individual retainer. Thus, a slit or opening in the seat must be made in order to obtain access to the retainer of the button which must be replaced so that this retainer can be disengaged from the button stem, the button removed, and a new button installed.

The seat button assembly of this invention obviates these various disadvantages of conventional seat buttons since it may be installed or removed from the outside of the seat after the panel has been mounted on the seat frame and without having to obtain access to the inner surface of the seat panel. Thus, there is no need for the buttons to be individually mounted on the panel before the panel is assembled on the seat frame, nor is there any need to slit or otherwise open the seat in order for the button to be replaced.

In the preferred embodiment of the invention, the stem of the seat button is provided with a tapered head at the free end thereof which is joined to the stem by an annular shoulder. A net of suitable material, such as wire or nylon, is either coated with a plastic material, such as vinyl plastisol, or encased within a layer of such material. The net is installed on the seat frame and is of an extent to cover a predetermined extent of the inner surface of the panel. After the panel has been installed on the seat frame, the buttons are inserted through the panel from the outer surface thereof at any selected point on this surface which is in alignment with the extent of the net. The tapered heads of the buttons are forced through a random opening or mesh of the net, and through the plastic layer if the net is encased therewithin, so that the shoulder overlies the net, or net and layer. The plastic material has memory and returns the opening to normal size to thereby locate the net, or net and layer, underlying the shoulder and resist withdrawal of the button. The buttons can be inserted by various types of equipment or manually inserted.

If for any reason the button must be replaced, the base is cut from the stem and the stem pushed through the panel to the inside of the seat. Thereafter a new button can be easily mounted on the seat in the same manner as the old one.

The primary object of this invention is to provide an improved seat button assembly which can be mounted on a panel of a vehicle seat without requiring access to the inner surface of the seat panel. Another object of this invention is to provide a seat button assembly which can be installed or removed at any one of a plurality of locations within a predetermined area of the outside of a seat without requiring access to the interior of the seat or to the inner surface of any panels of the seat. Yet a further object of this invention is to provide an improved mounting of seat buttons on vehicle seats wherein a woven net covers a predetermined area of the inner surface of the seat panel and a button inserted from the outer surface of the panel includes a shoulder which overlies the net around a random selected opening thereof after a leading portion of the stem has forcibly expanded the opening to permit passage of the shoulder therethrough.

These and other objects of this invention will be readily apparent from the following specification and drawings wherein.

Figure 1:
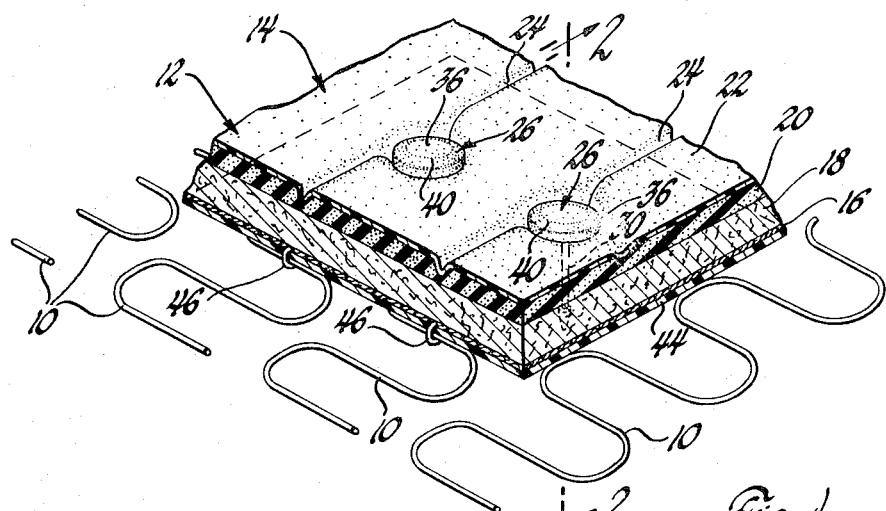
FIG. 1 is a perspective view of a portion of a vehicle seat having a seat panel mounted on the springs thereof and embodying seat buttons mounted on the panel according to this invention.
Figure 2:
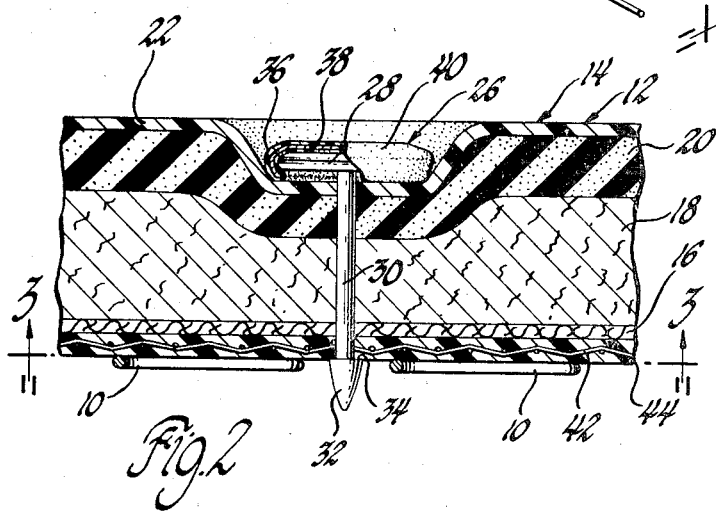
FIG. 2 is an enlarged view taken generally along the plane indicated by line 2-2 of FIG. 1.

FIG. 1 shows a portion of a vehicle seat back. Generally such seat backs include a perimeter frame, not shown, and a number of transversely spaced sinuous or so-called zigzag seat springs 10 having their ends anchored to the frame in a conventional manner. The back is conventionally hollow and includes a front cushion 12 and a spaced back cover, not shown, each conventionally being provided by various panels which are sewn or secured together to cover the frame and springs. As shown in FIGS. 1 and 2, a panel 14 of the front cushion 12 includes an insulator 16, such as burlap, a cotton pad 18, a pad 20 of foam rubber or plastic material, and an outer covering 22 of either cloth, plastic, or other suitable material.

The pad 20 and covering 22 may either be dielectrically embossed, as shown, or sewn to provide decorative grooves 24 in the outer surface of the panel. Seat buttons 26 at various locations on the outer surface of the seat panel add to the aesthetic appearance thereof and are mounted on the panel in a manner according to this invention, as will be hereinafter described.

The seat buttons 26 are conventional and generally include a metal cup base 28, FIG. 2, and a metal stem 30 staked or welded at one end to the base. The free end of the stem 30 includes a tapered head 32, which tapers outwardly of the stem toward the base 28, and is joined to the stem by an annular radial shoulder 34. The base 28 is provided with a decorative cap generally designated 36. Such cap conventionally includes a metal cup 38, which is covered with fabric or vinyl 40 and is then crimped to the base 28, as shown. The fabric or vinyl 40 may be the same as the material 22 or otherwise as desired.

Figure 3:
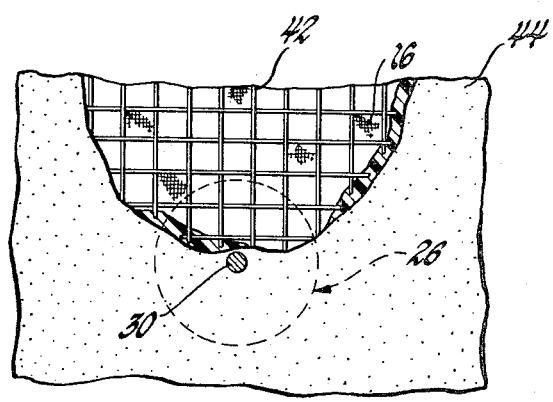
FIG. 3 is a partially broken away view taken generally along the plane indicated by line 3-3 of FIG. 2.
Figure 4:
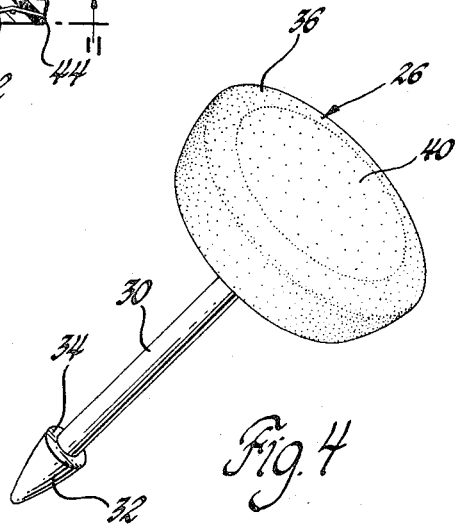
FIG. 4 is a perspective view of a seat button.

Referring now particularly to FIGS. 2 and 3 of the drawings, a woven net 42 of flexible but somewhat rigid material, such as nylon or metal wire, is encased within a layer 44 of vinyl plastisol. The net 42 and layer 44 are of equal predetermined extent, both length and width, and the net can be encased in a conventional extrusion or coating operation.

After a predetermined extent of net has been covered, it is located over a predetermined area of the seat springs 10 and secured thereto in a suitable manner, such as by hog rings 46. The net may likewise be mounted on the cushion 12 in a similar manner. Thereafter the cushion 12 and back cover, after being assembled from their respective panels, are then conventionally mounted on the seat frame to complete the seat back.

After the seat back has been completed, or the entire seat completed, the buttons 26 are either manually or mechanically forced through the seat cushion 12 at various locations or points on the outer surface of the panel. The points of insertion of the buttons 26 are in an area of the outer surface within the confines or extent of the net 42 on the inner surface of the panel. As each button is forced through the cushion 12, the tapered head 32 of the stem 30 engages and penetrates the plastic layer 44 and also forcibly displaces the net members defining a random opening or mesh of the net to expand such random opening or mesh, inasmuch as the diameter or size of the base of the head 32 is larger than the size of the openings of the net. After the head 32 has forcibly expanded a net opening and has passed through the plastic layer 44, the plastic memory of the layer returns the forcibly displaced net members of the net defining the opening to generally their original position to return the opening to its generally original size. Thus the members of the net defining the random opening underlie the shoulder 34 to thereby prevent any withdrawal of the button.

From the foregoing, it can be seen that there is no need to mount any of the buttons 26 on the seat cushion until after the seat cushion has been completed. As long as the location of the button is within the extent of the net 42, the button 26 can be easily mounted on the seat. There is also no need to align the head 32 of any button with any opening of the net, even if this could conceivably be done, since the head will always force its way through an opening of the net as long as the point of insertion on the outer surface of the cushion is within the confines of the net.

Although the net 42 is shown as being encased within a layer 44 of plastic material, the invention will work equally as well if the net 42 is merely coated with the same or other suitable plastic material so that the openings of the net are not filled with the plastic material.

If any button 26 needs to be replaced for any reason, the stem 30 of the button is cut immediately adjacent the base 28. Thereafter the stem 30 is pushed through the seat cushion so that it falls to the inside of the seat. A new button 26 can thereafter be inserted through the same hole and secured in place as previously described.

From the foregoing, it is believed apparent that installation or replacement of the seat button can be made from the exterior of the seat without the need of having any access whatsoever to the interior of the seat. Thus installation time and replacement time, as well as the effort required therefor, are reduced to a minimum.

Thus, this invention provides an improved mounting of seat buttons on vehicle seats.

I claim:

1. In combination with a seat panel, a seat button assembly comprising, in combination, a button having a base, a stem connected at one end to the base and having a free end portion joined to an adjacent portion of smaller cross section by a shoulder, a flexible net on one side of the panel and having an expandable network of openings of a normal size smaller than the largest cross section of the stem, the button being inserted through the panel from the other side thereof to the one side thereof to force the free end portion of the stem through a forcibly expanded random opening of the net, and means resisting expansion of the random opening by the free end portion and returning the opening to generally normal size after penetration thereof by the free end portion to locate the opening adjacent the stem shoulder whereby the net underlies the shoulder and resists withdrawal of the button from the other side of the panel.

2. In combination with a seat panel, a seat button assembly comprising, in combination, a button having a base, an annular axially extending stem connected at one end to the base and provided with a head at the other free end thereof tapering axially outwardly of the stem toward the base joined to the stem by a radial shoulder, a flexible net on one side of the panel and having an expandable network of openings of a normal size smaller than the largest cross section of the tapered head, the button being inserted through the panel from the other side thereof to the one side thereof to force the tapered head and shoulder through a forcibly expanded random opening of the net, and means resisting expansion of the random opening by the head and shoulder and returning the mesh to generally normal size after penetration thereof by the head to locate the opening adjacent the stem shoulder whereby the net underlies the shoulder and resists withdrawal of the button from the other side of the panel.

3. In combination with a seat panel, a seat button assembly comprising, in combination, a button having a base, an annular stem connected at one end to the base and having a radial shoulder adjacent the free end portion thereof, a layer of flexible penetrable plastic material having memory on one side of the panel, a flexible net encased within the layer of plastic material and having an expandable network of openings of a normal size smaller than the largest cross section of the free end portion of the stem, the button being inserted through the panel from the other side thereof to the one side thereof to force the free end portion of the stem through the layer of plastic material and through a forcibly expanded random opening of the net, the shoulder of the stem engaging the surface of the layer remote from the panel and the plastic memory returning the forcibly expanded random opening to generally normal size to locate the net underlying the shoulder and thereby resist withdrawal of the button from the other side of the panel.

4. In combination with a seat panel, a seat button assembly comprising, in combination, a button having a base, an annular stem connected at one end to the base and provided with a head at the other free end thereof tapering axially outwardly of the stem toward the base and joined to the stem by a radial shoulder, a layer of flexible penetrable plastic material having memory on one side of the panel, a flexible net encased within the layer of plastic material and having a network of expandable openings of a normal size smaller than the largest cross section of the tapered head, the button being inserted through the panel from the other side thereof to the one side thereof to force the tapered head and shoulder through the layer of plastic material and through a forcibly expanded random opening of the net, the shoulder of the stem engaging the surface of the layer remote from the panel and the plastic memory returning the forcibly expanded random opening to generally normal size to locate the net under the shoulder and thereby resist withdrawal of the button from the other side of the panel.

5. In combination with a vehicle seat having a penetrable seat panel of predetermined thickness, the outer surface of the panel defining a portion of the outer surface of the seat and the inner surface of the panel being wholly contained within the seat and inaccessible from the outside of the seat, a seat button having a base and a stem, stem locking means of predetermined extent mounted on the panel adjacent the inner surface thereof and inaccessible from the outside of the seat, the locking means being located in aligned spaced relationship by the thickness of the panel with a predetermined extent of the outer surface of the panel, the stem being inserted at a random selected point in the predetermined extent of the outer surface of the panel and through the panel and inner surface thereof, and means on the stem engageable with the locking means to lock the stem thereto and resist withdrawal of the seat button through the panel.

6. In combination with a vehicle seat having a penetrable seat panel, the outer surface of the panel defining a portion of the outer surface of the seat and the inner surface of the panel being wholly contained within the seat and inaccessible from the outside of the seat, a seat button having a base and a stem provided with a shoulder adjacent the free end portion thereof, a flexible woven net of predetermined extent mounted on the panel adjacent the inner surface thereof and inaccessible from the outside of the seat, the openings of the net being of a normal size smaller than the size of the free end portion of the stem, the net being located in aligned spaced relationship with a predetermined extent of the outer surface of the panel, the stem being inserted at a random selected point in the predetermined extent of the outer surface of the panel and through the panel to force the free end portion and shoulder thereof through a random forcibly expanded opening of the net, and means returning the opening to normal size to locate the net underlying the shoulder and thereby resist withdrawal of the button through the panel.